(12) United States Patent
Chen et al.

(10) Patent No.: US 12,113,247 B2
(45) Date of Patent: Oct. 8, 2024

(54) SHELL FOR BATTERY CELL, BATTERY CELL, BATTERY, AND POWER CONSUMING DEVICE

(71) Applicant: CONTEMPORARY AMPEREX TECHNOLOGY CO., LIMITED, Ningde (CN)

(72) Inventors: Xiaobo Chen, Ningde (CN); Mingguang Gu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/604,186

(22) Filed: Mar. 13, 2024

(65) Prior Publication Data
US 2024/0222822 A1 Jul. 4, 2024

Related U.S. Application Data

(63) Continuation of application No. PCT/CN2022/088855, filed on Apr. 24, 2022.

(51) Int. Cl.
*H01M 50/578* (2021.01)
*H01M 50/581* (2021.01)
(52) U.S. Cl.
CPC ....... *H01M 50/578* (2021.01); *H01M 50/581* (2021.01); *H01M 2220/20* (2013.01)
(58) Field of Classification Search
CPC .......................... H01M 50/578; H01M 50/581
See application file for complete search history.

(56) References Cited

U.S. PATENT DOCUMENTS

2006/0115713 A1* 6/2006 Kim ................... H01M 50/574
 429/61
2010/0310906 A1* 12/2010 Kim ................... H01M 50/3425
 429/82

FOREIGN PATENT DOCUMENTS

| CN | 201868519 U | * | 6/2011 |
| CN | 113544890 A | | 10/2021 |
| CN | 215578755 U | | 1/2022 |

(Continued)

OTHER PUBLICATIONS

CN-201868519-U Translation (Year: 2011).*

(Continued)

*Primary Examiner* — Jimmy Vo
(74) *Attorney, Agent, or Firm* — ANOVA LAW GROUP, PLLC

(57) ABSTRACT

A shell for a battery cell includes a pressure relief mechanism that includes: a body; a first weakened portion arranged on the body, the first weakened portion having two first free ends, and a line connecting the two first free ends not completely overlapping with the first weakened portion and jointly defining a pressure relief portion; and a second weakened portion arranged on the body, a first projection of the first weakened portion on a plane perpendicular to a first direction not intersecting a second projection of the second weakened portion on the plane, the first direction being a thickness direction of the pressure relief portion. The pressure relief portion is configured to be opened with the first weakened portion as a boundary and flip toward one side where the second weakened portion is located when an internal pressure or temperature of the battery cell reaches a threshold.

20 Claims, 10 Drawing Sheets

(56) References Cited

FOREIGN PATENT DOCUMENTS

| | | |
|---|---|---|
| CN | 216354617 U | 4/2022 |
| JP | 2009099301 A | 5/2009 |

OTHER PUBLICATIONS

The World Intellectual Property Organization (WIPO) International Search Report and Written Opinion for PCT/CN2022/088855 Nov. 25, 2022 15 Pages (including translation).

* cited by examiner

SHELL FOR BATTERY CELL, BATTERY CELL, BATTERY, AND POWER CONSUMING DEVICE

CROSS-REFERENCE TO RELATED APPLICATION

This application is a continuation of International Application No. PCT/CN2022/088855, filed on Apr. 24, 2022, the entire content of which is incorporated herein by reference.

TECHNICAL FIELD

The present application relates to the technical field of batteries, and in particular, to a shell for a battery cell, a battery cell, a battery, and a power consuming device.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. For the electric vehicles, the battery technology is an important factor to their development.

During charging, discharging and use of a battery, safety problems are likely to occur if the internal pressure or temperature of the battery rises abnormally, which will not only affect the service life of the battery, but also affect personal safety of users. Therefore, how to improve safety of batteries is an important research and development direction.

SUMMARY

The present application is intended to solve at least one of the technical problems existing in the related art. To this end, an objective of the present application is to provide a shell for a battery cell, a battery cell, a battery, and a power consuming device, in order to improve safety of the battery.

According to an embodiment in a first aspect of the present application, a shell for a battery cell is provided. The shell includes a pressure relief mechanism. The pressure relief mechanism includes: a body; a first weakened portion arranged on the body, the first weakened portion having two first free ends, and a line connecting the two first free ends not completely overlapping with the first weakened portion and jointly defining a pressure relief portion; and a second weakened portion arranged on the body, a first projection of the first weakened portion on a plane perpendicular to a first direction not intersecting a second projection of the second weakened portion on the plane, the first direction being a thickness direction of the pressure relief portion, wherein the pressure relief portion is configured to be opened with the first weakened portion as a boundary and flip toward one side where the second weakened portion is located when an internal pressure or temperature of the battery cell reaches a threshold.

In the technical solution of the embodiment of the present application, the pressure relief mechanism is provided with the two weakened portions such that, when the internal pressure or temperature of the battery cell reaches the threshold, the pressure relief portion is opened along one of the weakened portions and flips toward the side where the other weakened portion is located. The direction in which the pressure relief mechanism cracks along one of the weakened portions (i.e., the first weakened portion) defines a valve opening direction of the pressure relief mechanism, so that countermeasures can be taken in advance, thereby improving the safety of the battery. The other weakened portion (i.e., the second weakened portion) is configured such that the pressure relief portion can flip faster toward the side where this weakened portion is located. In other words, compared with the technical solution in which no second weakened portion is provided, the pressure relief portion can flip to a larger angle (flip faster) within the same amount of time due to the presence of the second weakened portion, so as to facilitate rapid and effective pressure relief of the battery cell.

In addition, in the above technical solution, the projection of the first weakened portion does not intersect the projection of the second weakened portion on the plane perpendicular to the first direction, which can avoid stress concentration of the weakened portions in the intersection region, so as to reduce the risk of the pressure relief mechanism starting pressure relief before the internal pressure of the battery cell reaches an initiation pressure and also prevent the pressure relief mechanism from cracking in the intersection region to result in an inaccurate valve opening direction, thereby improving breaking resistance of the pressure relief mechanism, facilitating effective pressure relief of the battery cell, and prolonging the service life of the battery cell.

Therefore, the shell according to the present application can improve breaking resistance of the pressure relief mechanism, facilitate effective pressure relief of the battery cell, and prolong the service life of the battery cell, thereby improving safety of the battery.

In some embodiments, a first pressure relief groove and a second pressure relief groove are formed in the body, the first weakened portion is a bottom wall of the first pressure relief groove, and the second weakened portion is a bottom wall of the second pressure relief groove. As described above, each weakened portion is arranged at the bottom of the pressure relief groove to form a part of the pressure relief mechanism having a relatively low strength, which can facilitate manufacturing and machining of the weakened portion.

In some embodiments, the first pressure relief groove is located in a first surface of the body, and the second pressure relief groove is located in a second surface of the body opposite to the first surface. Forming the two pressure relief grooves, which define the weakened portions, in different surfaces of the body can prevent material squeezing during manufacturing of the two pressure relief grooves, so as to prevent the influence of the material squeezing on the flatness of the surfaces of the body. In addition, compared with the solution in which the two pressure relief grooves are arranged in the same surface, forming the two pressure relief grooves in different surfaces of the body can further reduce the structural strength of the body, so as to facilitate the opening and flipping of the pressure relief portion.

In some embodiments, the first surface is an outer surface of the body, and the second surface is an inner surface of the body. The arrangement of the first weakened portion, which is configured for opening, on the outer surface of the body as described above can facilitate the manufacturing and machining of the first weakened portion and improve the manufacturing quality of the first weakened portion, so as to facilitate the pressure relief mechanism to achieve accurate and effective valve opening as required. In addition, the arrangement of the second pressure relief groove in the inner surface of the body is more conducive to flipping of the pressure relief portion toward the exterior of the shell.

In some embodiments, the depth of the first pressure relief groove is greater than that of the second pressure relief groove, and the thickness of the first weakened portion is less than that of the second weakened portion. According to the above solution of the embodiments, it is possible to ensure the pressure relief portion to open at the first weakened portion and flip toward the side where the second weakened portion is located when the internal pressure or temperature of the battery cell reaches the threshold, so as to ensure the valve opening direction of the pressure relief mechanism, thereby ensuring the safety of the battery.

In some embodiments, the first pressure relief groove includes a plurality of first groove portions, which are sequentially arranged in a depth direction of the first pressure relief groove and have widths gradually decreasing in the depth direction of the first pressure relief groove. The first pressure relief groove is of a multi-stage groove structure, which can reduce a forming force applied to the body during forming of each stage of groove, so as to reduce the risk of generating cracks in the body during forming of the first pressure relief groove, thereby improving the long-term reliability of the pressure relief mechanism.

In some embodiments, the second pressure relief groove includes a plurality of second groove portions, which are sequentially arranged in a depth direction of the second pressure relief groove and have widths gradually decreasing in the depth direction of the second pressure relief groove. The second pressure relief groove is of a multi-stage groove structure, which can reduce a forming force applied to the pressure relief body during forming of each stage of groove, so as to reduce the risk of generating cracks in the pressure relief body during forming of the second pressure relief groove, thereby improving the long-term reliability of the pressure relief mechanism.

In some embodiments, the line connecting the two first free ends has a third projection on the plane, and an extension direction of the second projection is consistent with that of the third projection. By means of setting the extension direction of the line connecting the two free ends of the first weakened portion to be consistent with the extension direction of the second weakened portion, the pressure relief portion can flip in a more accurate flipping direction, so as to facilitate rapid and effective pressure relief of the battery cell.

In some embodiments, the second projection at least partially overlaps with the third projection in a direction perpendicular to the extension direction of the second projection. According to the above solution of the embodiments, it is further possible to allow the pressure relief portion to flip faster toward the side where the second weakened portion is located, so as to facilitate rapid and effective pressure relief of the battery cell.

In some embodiments, the second projection is located on one side of the third projection close to the first projection, and is spaced apart from the third projection. The arrangement of the second weakened portion in the pressure relief portion defined by the first weakened portion as described above can transfer the flipping force to the vicinity of the second weakened portion faster, so that the pressure relief portion can flip faster, so as to achieve rapid and effective pressure relief of the battery cell.

In some embodiments, the second projection is located on one side of the third projection that faces away from the first projection, and is spaced apart from the third projection. The arrangement of the second weakened portion on the outer side of the pressure relief portion defined by the first weakened portion as described above can achieve a larger valve opening area of the pressure relief portion, so as to facilitate rapid and effective pressure relief of the battery cell.

In some embodiments, a perpendicular bisector of the third projection overlaps with a perpendicular bisector of the second projection. According to the above solution of the embodiments, the second weakened portion may be symmetrical with respect to the perpendicular bisector of the line connecting the two ends of the first weakened portion, and the pressure relief portion can better flip toward the side where the second weakened portion is located, so as to ensure more accurate flipping direction and valve opening direction of the pressure relief portion, thereby achieving higher safety.

In some embodiments, the first projection is symmetrical with respect to the perpendicular bisector of the third projection. According to the above solution of the embodiments, the first weakened portion may have consistent structural strength and stress bearing capacity on two sides of its own perpendicular bisector, which ensures the first weakened portion to open synchronously on the two sides when the internal pressure of the battery cell reaches the threshold, so as to achieve more accurate valve opening direction of the pressure relief mechanism, thereby achieving higher safety.

In some embodiments, the second projection has two second free ends, and the minimum gap between one of the second free ends and the first projection is not greater than one third of the length of the third projection, and/or the minimum gap between the other second free end and the first projection is not greater than one third of the length of the third projection. According to the above solution of the embodiments, setting the gap between the first weakened portion and the second weakened portion to be within a reasonable range can ensure the pressure relief portion to quickly and accurately flip toward the side where the second weakened portion is located after cracking along the first weakened portion.

In some embodiments, the minimum gap between one of the second free ends and the first projection is less than 10 mm, and/or the minimum gap between the other second free end and the first projection is less than 10 mm. According to the above solution of the embodiments, it is possible to facilitate the pressure relief portion to quickly and accurately flip toward the side where the second weakened portion is located, so as to facilitate rapid and effective pressure relief of the pressure relief mechanism.

In some embodiments, the first projection is in the form of an arc, a fold line, or a combination of an arc and a fold line. By means of setting the first weakened portion in the form of an arc, a fold line, or a combination of an arc and a fold line, the shape of the pressure relief portion can be defined as required to increase the valve opening area of the pressure relief mechanism to achieve rapid pressure relief, thereby further improving the safety.

In some embodiments, the shell includes a shell body with an opening and an end cap covering the opening, an accommodating cavity for accommodating the battery cell is formed between the shell body and the end cap, and the pressure relief mechanism is arranged on at least one of side walls of the shell body, and/or the pressure relief mechanism is arranged on the end cap. In this way, the pressure relief mechanism can be integrated in the shell body or the end cap that can accommodate the battery cell, so that the pressure relief mechanism has both an accommodating function and a pressure relief function.

In some embodiments, a recess is formed in the shell, and the body of the pressure relief mechanism is a recess bottom of the recess. In the above technical solution, the thickness of the bottom wall of the recess may be less than the wall thickness of the other part. In this case, the relatively thin bottom wall of the recess serves as the body of the pressure relief mechanism, which is conducive to valve opening of the pressure relief mechanism. Moreover, the recess is recessed from the surface of the shell, so that the pressure relief mechanism may be away from the surface of the shell, and thus the pressure relief mechanism is not likely to come into contact with other objects to cause damage.

In some embodiments, side walls of the recess include a first side wall and a second side wall opposite to each other, an extension direction of a projection of the first side wall on the plane is consistent with an extension direction of the first projection, and an extension direction of a projection of the second side wall on the plane is consistent with the extension direction of the second projection. According to the above solution of the embodiments, each weakened portion may be machined with the corresponding side wall of the recess as the reference, so as to facilitate the machining of the weakened portion.

In some embodiments, the thickness of the body is less than that of a portion of the shell other than the pressure relief mechanism. According to the above solution of the embodiments, it is possible to facilitate the opening and flipping of the pressure relief portion, and prevent the other part of the shell from cracking early when the internal pressure or temperature of the battery cell exceeds the threshold.

According to an embodiment in a second aspect of the present application, a battery cell is provided, including a shell in the above embodiments.

According to an embodiment in a third aspect of the present application, a battery is provided, including a battery cell in the above embodiment.

According to an embodiment in a fourth aspect of the present application, a power consuming device is provided. The power consuming device includes a battery in the above embodiment configured to supply electric energy.

The technical effects of the battery cell, the battery and the power consuming device mentioned above are the same as those of the shell in the above embodiment, which will not be described again herein.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

In the drawings, the same reference signs denote the same or similar components or elements throughout multiple drawings, unless otherwise specified. The drawings are not necessarily drawn to scale. It should be understood that these drawings depict only some implementations according to the present application and should not be construed as limiting the scope of the present application.

Figure 1:
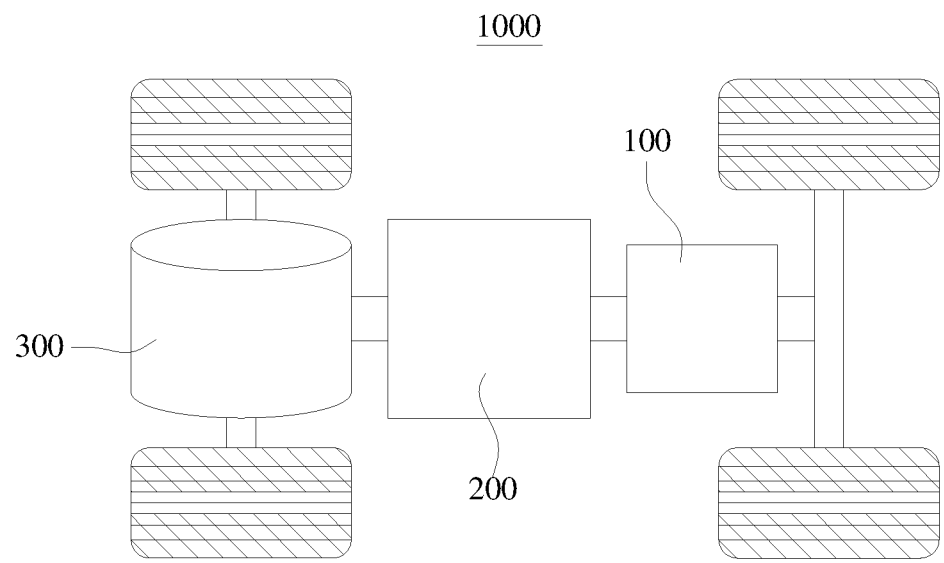
FIG. 1 is a schematic structure diagram of a vehicle according to some embodiments of the present application.

LIST OF REFERENCE SIGNS vehicle 1000;
battery 100, controller 200, motor 300;
case 10, first portion 11, second portion 12;
battery cell 20, end cap 21, electrode terminal 21a, shell body 22, cell assembly 23, tab 23a;
shell 40, shell body 410, end cap 420, pressure relief mechanism 430, body 431, first weakened portion 432, first free end 432a, 432b, pressure relief portion 4311, second weakened portion 433, first direction z, plane P, first projection 4321, second projection 4331, third projection 4323, first pressure relief groove 4322, second pressure relief groove 4332, first groove portion 4322a, second groove portion 4332a, second free end 4331a, 4331b, through hole 421, 422, first side wall 441, second side wall 442.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art should understand explicitly or implicitly that the embodiments described herein may be combined with other embodiments.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. are based on the orientation or position relationship shown in the accompanying drawings and are merely intended to facilitate and simplify the description of the embodiments of the present application, rather than indicating or implying that the device or element referred to must have a specific orientation or be constructed and operated in a described orientation, and therefore cannot be construed as limiting the embodiments of the present application.

In the description of the embodiments of the present application, unless otherwise explicitly specified and defined, the technical terms such as "mounting", "connecting", "connection", and "fixing" should be understood in a broad sense, for example, they may be a fixed connection, a detachable connection, or an integrated connection; may be a mechanical connection or an electric connection; and may be a direct connection or an indirect connection by means of an intermediate medium, or may be internal communication between two elements or interaction between the two elements. For those of ordinary skill in the art, the specific meanings of the above terms in the embodiments of the present application can be understood according to specific situations.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, market demand for the traction batteries is also expanding.

For battery cells, the main safety hazard comes from the charging and discharging process, and an appropriate environmental temperature is also required. To effectively avoid unnecessary losses, there are usually at least three protection measures for the battery cell. Specifically, the protection measures include at least a switching element, a properly selected separator material and a pressure relief mechanism. The switching element refers to an element which can stop the charging or discharging of a battery when the temperature or resistance in a battery cell reaches a certain threshold. The separator is configured to isolate a positive electrode plate from a negative electrode plate and can automatically dissolve micron-sized (or even nanoscale) micropores attached to the separator when the temperature rises to a certain value, thus preventing metal ions from passing through the separator and terminating an internal reaction of the battery cell.

The pressure relief mechanism refers to an element or component that is actuated, when an internal pressure or temperature of the battery cell reaches a predetermined threshold, to relieve the internal pressure or heat. The threshold design varies according to different design requirements. The threshold may depend on the material of one or more of the positive electrode plate, the negative electrode plate, an electrolyte and the separator of the battery cell. The "actuation" mentioned in the present application means that the pressure relief mechanism acts or is activated to a certain state, such that the internal pressure and heat of the battery cell can be relieved. Actions produced by the pressure relief mechanism may include, but are not limited to, at least a portion of the pressure relief mechanism being broken, cracked, torn or opened, etc. When the pressure relief mechanism is actuated, high-temperature and high-pressure substances inside the battery cell are discharged outward from an actuated part as emissions. In this way, the pressure of the battery cell can be relieved under a condition of a controllable pressure or temperature, thereby preventing the occurrence of potentially more serious accidents. The emissions from the battery cell mentioned in the present application include, but are not limited to, the electrolyte, dissolved or split positive and negative electrode plates, fragments of the separator, a high-temperature and high-pressure gas generated by a reaction, flames, etc.

The pressure relief mechanism on the battery cell has an important influence on the safety of the battery. For example, when short circuit, overcharge and other phenomena occur, it may lead to thermal runaway inside the battery cell, resulting in a sudden increase in pressure or temperature. In this case, the internal pressure and heat can be released outward by means of the actuation of the pressure relief mechanism to prevent the battery cell from exploding and catching fire. The pressure relief mechanism may take the form of an anti-explosion valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism operates or a weakened structure provided in the pressure relief mechanism is broken, so as to form a through port or channel for relieving the internal pressure or heat.

The inventors have noticed that for a general pressure relief mechanism, the entire anti-explosion valve is likely to completely burst and form multiple fragments separated from a top cover plate, and these fragments are likely to cause damage to other parts to affect safety of traction batteries. In addition, after a battery cell has been used for a period of time, the pressure relief mechanism is likely to start for pressure relief or crack at an unexpected position before the internal pressure of the battery cell reaches an initiation pressure to result in abnormal valve opening of the battery cell or even cause failure of the entire battery cell to affect the service life and safety of the battery cell.

In view of this, an embodiment of the present application provides a shell for a battery cell, the shell including a pressure relief mechanism. The pressure relief mechanism includes a body, a first weakened portion, and a second weakened portion. The first weakened portion is arranged on the body and has two first free ends, and a line connecting the two first free ends does not completely overlap with the first weakened portion and jointly define a pressure relief portion. The second weakened portion is arranged on the body, and a first projection on a plane perpendicular to a first direction does not intersect a second projection of the second weakened portion on the plane, the first direction being a thickness direction of the pressure relief portion. The pressure relief portion is configured to, when an internal pressure or temperature of the battery cell reaches a threshold, open with the first weakened portion as a boundary and flip toward one side where the second weakened portion is located.

By means of providing the first weakened portion and the second weakened portion in the pressure relief mechanism, when the internal pressure or temperature of the battery cell reaches the threshold, the pressure relief portion opens along the first weakened portion and flips toward the side where the second weakened portion is located. The extension direction of the first weakened portion defines a valve opening direction of the pressure relief mechanism, so that countermeasures can be taken in advance, thereby improving the safety of the battery. By means of providing the second weakened portion, the pressure relief portion can flip faster, so as to facilitate the pressure relief portion to flip after cracking to quickly achieve pressure relief to prevent the pressure relief portion from completely bursting open to form multiple fragments.

In addition, in the above technical solution, the projection of the first weakened portion does not intersect the projection of the second weakened portion on the plane perpendicular to the first direction, which can avoid stress concentration of the weakened portions in the intersection region, so as to reduce the risk of the pressure relief mechanism starting pressure relief before the internal pressure of the battery cell reaches an initiation pressure and also prevent the pressure relief mechanism from cracking in the intersection region to result in a wrong valve opening direction, thereby improving breaking resistance of the pressure relief mechanism, facilitating effective pressure relief of the battery cell, and prolonging the service life of the battery cell.

The shell disclosed in the embodiments of the present application may be used for, but not limited to, a battery cell. The battery cell may include a lithium ion secondary battery, a lithium ion primary battery, a lithium-sulfur battery, a sodium-lithium ion battery, a sodium ion battery or a magnesium ion battery, etc., which is not limited in the embodiments of the present application. The battery cell may be in the form of a cylinder, a flat body, a cuboid, or the like, which will also not be limited in the embodiments of the present application.

The battery cell disclosed in the embodiments of the present application may be used in, but is not limited to, a power consuming device, such as a vehicle, a ship, or an aircraft. A power supply system provided with the power consuming device composed of a battery cell, a battery and the like disclosed in the present application may be used.

Embodiments of the present application provide a power consuming device using a battery as a power supply. The power consuming device may be, but is not limited to, a cell phone, a tablet, a laptop, an electric toy, an electric tool, an electric scooter, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

In the following embodiments, for ease of illustration, an example in which a power consuming device according to an embodiment of the present application is a vehicle 1000 is taken for description.

Referring to FIG. 1, FIG. 1 is a schematic structure diagram of a vehicle 1000 according to some embodiments of the present application. The vehicle 1000 may be a fuel vehicle, a gas vehicle, or a new energy vehicle. The new energy vehicle may be a battery electric vehicle, a hybrid electric vehicle, or an extended-range vehicle, etc. A battery 100 is provided inside the vehicle 1000, and the battery 100 may be arranged at the bottom, the head or the tail of the vehicle 1000. The battery 100 may be configured to supply power to the vehicle 1000. For example, the battery 100 may be used as a power supply for operating the vehicle 1000. The vehicle 1000 may further include a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 may not only serve as a power supply for operating the vehicle 1000, but also serve as a power supply for driving the vehicle 1000, thus replacing or partially replacing fuel or natural gas to provide driving power for the vehicle 1000.

Figure 2:
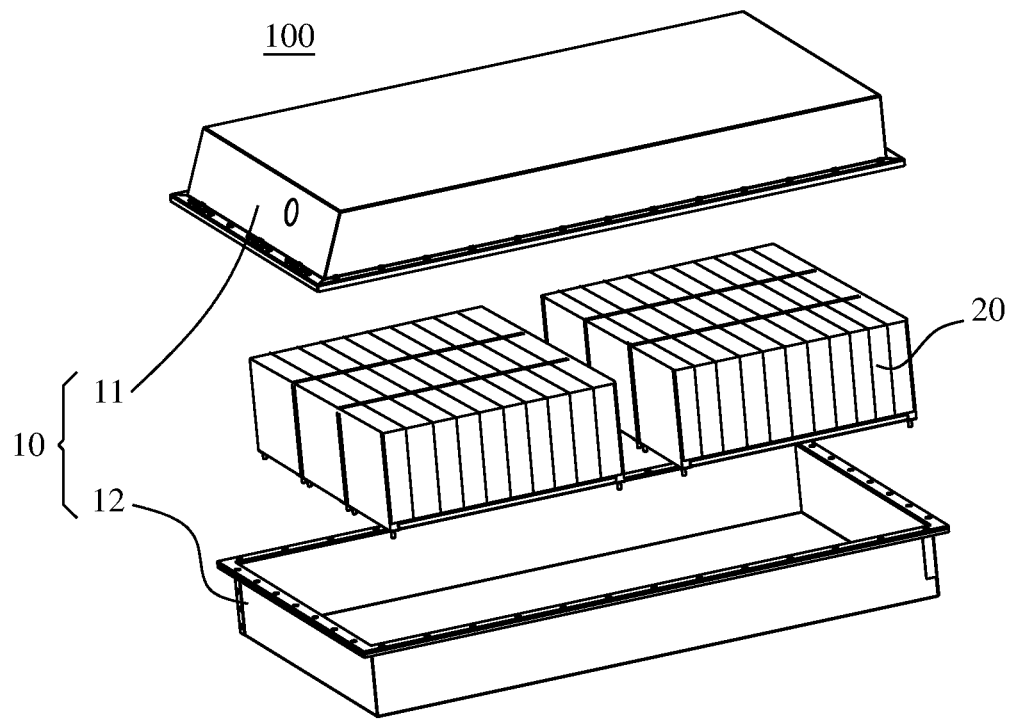
FIG. 2 is a schematic exploded structure diagram of a battery according to some embodiments of the present application.

Referring to FIG. 2, FIG. 2 is an exploded view of a battery 100 according to some embodiments of the present application. The battery 100 includes a case 10 and a battery cell 20. The battery cell 20 is accommodated in the case 10. The case 10 is configured to provide an accommodation space for the battery cell 20, and the case 10 may be of various structures. In some embodiments, the case 10 may include a first portion 11 and a second portion 12. The first portion 11 and the second portion 12 are fitted to each other in a covering manner, and the first portion 11 and the second portion 12 jointly define the accommodation space for accommodating the battery cell 20. The second portion 12 may be of a hollow structure with one end open, the first portion 11 may be of a plate-like structure, and the first portion 11 covers an open side of the second portion 12 such that the first portion 11 and the second portion 12 jointly define the accommodation space; and the first portion 11 and the second portion 12 each may also be of a hollow structure with one side open, and the open side of the first portion 11 covers the open side of the second portion 12. Of course, the case 10 formed by the first portion 11 and the second portion 12 may be in various forms, such as a cylinder and a cuboid.

In the battery 100, a plurality of battery cells 20 may be provided. The plurality of battery cells 20 may be in series connection, in parallel connection, or in parallel-series connection. The parallel-series connection means that some of the plurality of battery cells 20 are connected in series and some are connected in parallel. The plurality of battery cells 20 may be directly connected together in series, or in parallel, or in series-parallel, and then a whole composed of the plurality of battery cells 20 is accommodated in the case 10. Of course, the battery 100 may also be in such a way that a plurality of battery cells 20 are first connected in series or in parallel or in series and parallel to form a plurality of battery module, and then the plurality of battery modules are connected in series or in parallel or in series and parallel to form a whole and are accommodated in the case 10. The battery 100 may further include other structures. For example, the battery 100 may further include a busbar component for achieving electrical connections between the plurality of battery cells 20.

Each battery cell 20 may be a secondary battery or a primary battery; or may be a lithium-sulfur battery, a sodium-ion battery, or a magnesium-ion battery, but is not limited thereto. The battery cell 20 may be in the form of a cylinder, a flat body, a cuboid, or the like.

Figure 3:
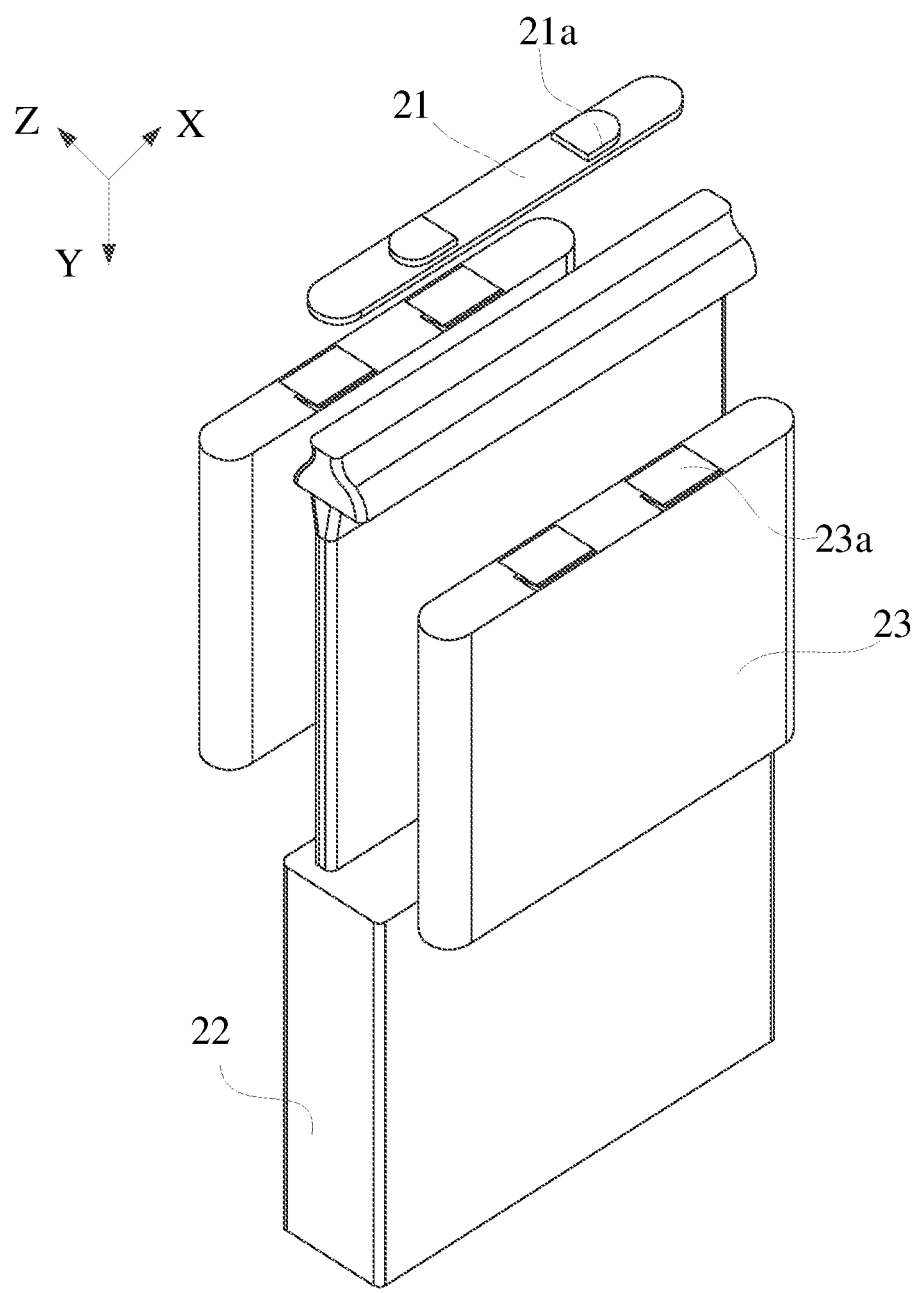
FIG. 3 is a schematic exploded structure diagram of a battery cell according to some embodiments of the present application.

Referring to FIG. 3, FIG. 3 is a schematic exploded structure diagram of a battery cell 20 according to some embodiments of the present application. The battery cell 20 refers to a minimum unit that constitutes a battery. As shown in FIG. 3, the battery cell 20 includes an end cap 21, a shell body 22, a cell assembly 23 and other functional components.

The end cap 21 refers to a component that covers an opening of the shell body 22 to isolate an internal environment of the battery cell 20 from an external environment. Without limitation, the end cap 21 may be shaped to adapt to the shape of the shell body 22 so as to fit with the shell body 22. Optionally, the end cap 21 may be made of a material (for example, an aluminum alloy) with a certain hardness and strength. In this way, the end cap 21 is less prone to deformation when subjected to compression and collision, so that the battery cell 20 may have a higher structural strength and the safety performance can also be improved. Functional components, such as electrode terminals 21a, may be arranged on the end cap 21. The electrode terminals 21a may be used for electrical connection to the cell assembly 23 for outputting or inputting electric energy of the battery cell 20. In some embodiments, the end cap 21 may also be provided with a pressure relief mechanism configured to release an internal pressure or heat when the internal pressure or temperature of the battery cell 20 reaches a threshold. The end cap 21 may be made of various materials, such as copper, iron, aluminum, stainless steel, an aluminum alloy, and plastic, which will not be specifically limited in the embodiments of the present application. In some embodiments, an insulating member may also be provided on an inner side of the end cap 21, and the insulating member may be configured to isolate electrically connected components in the shell body 22 from the end cap 21 to reduce the risk of short circuit. Illustratively, the insulating member may be made of plastic, rubber, etc.

The shell body 22 is an assembly configured to cooperate with the end cap 21 to form the internal environment of the battery cell 20, wherein the formed internal environment may be used to accommodate the cell assembly 23, an electrolyte, and other components. The shell body 22 and the end cap 21 may be separate components, the shell body 22 may be provided with an opening, and the internal environment of the battery cell 20 is formed by making the end cap 21 cover the opening at the opening. Without limitation, the end cap 21 and the shell body 22 may also be integrated with each other. Specifically, the end cap 21 and the shell body 22 may form a common connection face before other components are inserted into the shell. When the interior of the shell body 22 needs to be packaged, the end cap 21 then covers the shell body 22. The shell body 22 may have various shapes and various sizes, for example, in the form of a cuboid, a cylinder, a hexagonal prism, etc. Specifically, the shape of the shell body 22 may be determined according to the specific shape and dimensions of the cell assembly 23. The shell body 22 may be made of various materials, such as copper, iron, aluminum, stainless steel, an aluminum alloy, and plastic, which is not particularly limited in the embodiments of the present application.

The cell assembly 23 is a component in the battery cell 20 where an electrochemical reaction takes place. The shell body 22 may contain one or more cell assemblies 23. The cell assembly 23 is mainly formed by winding or stacking a positive electrode plate and a negative electrode plate, and a separator is usually provided between the positive electrode plate and the negative electrode plate. Portions of the positive electrode plate and the negative electrode plate that each have an active material constitute a main body portion of the cell assembly, and portions of the positive electrode plate and the negative electrode plate that have no active material each constitute a tab 23a. A positive electrode tab and a negative electrode tab may be respectively located at one end of the main body portion together or at two ends of the main body portion. During the charging/discharging process of the battery, a positive electrode active material and a negative electrode active material react with an electrolyte, and the tabs 23a are connected to the electrode terminals to form a current loop.

According to some embodiments of the present application, as shown in FIGS. 4 to 8, the present application provides a shell 40 for a battery cell, the shell including a pressure relief mechanism 430. The pressure relief mechanism 430 includes a body 431, a first weakened portion 432, and a second weakened portion 433. The first weakened portion 432 is arranged on the body 431 and has two first free ends 432a, 432b, and a line connecting the two first free ends 432a, 432b does not completely overlap with the first weakened portion 432 and jointly define a pressure relief portion 4311. The second weakened portion 433 is arranged on the body 431, and a first projection 4321 of the first weakened portion 432 on a plane perpendicular to a first direction z does not intersect a second projection 4331 of the second weakened portion 433 on this plane, the first direction z being a thickness direction of the pressure relief portion 4311. The pressure relief portion 4311 is configured to, when an internal pressure or temperature of the battery cell reaches a threshold, open with the first weakened portion 432 as a boundary and flip toward one side where the second weakened portion 433 is located.

The features of the battery cell in the above implementation are substantially the same as those of the battery cell 20 described above in FIGS. 2 and 3, which will not be described in detail herein. The shell 40 may include an end cap 420 and a shell body 410. Here, the features of the end cap 420 and the shell body 410 are substantially the same as those of the end cap 21 and the shell body 22 described above in FIG. 3, which will not be described in detail herein.

The body 431 of the pressure relief mechanism 430 may be an independent component mounted on the shell body 410 or the end cap 420. For example, the body 431 may be of a plate-like structure mounted on the end cap 420 or the shell body 410, and is specifically a rupture disc. For another example, the body 431 may be integrally formed with the end cap 420 or the shell body 410, that is, a portion of the end cap 420 or the shell body 410 itself serves as the body 431.

The first weakened portion 432 and the second weakened portion 433 may be portions of the body 431 with a relatively small thickness or portions of the body 431 with a relatively low material strength, and the present application will not be limited to the above examples. The first weakened portion 432 is configured to define a part of the pressure relief mechanism 430 to be preferentially broken, and when the internal pressure or temperature of the battery cell reaches a threshold, the pressure relief mechanism 430 will preferentially crack from the first weakened portion 432. When the internal pressure or temperature of the battery cell reaches the threshold, the pressure relief mechanism 430 cracks from the first weakened portion 432 and then flips toward the side where the second weakened portion 433 is located.

Figure 7:
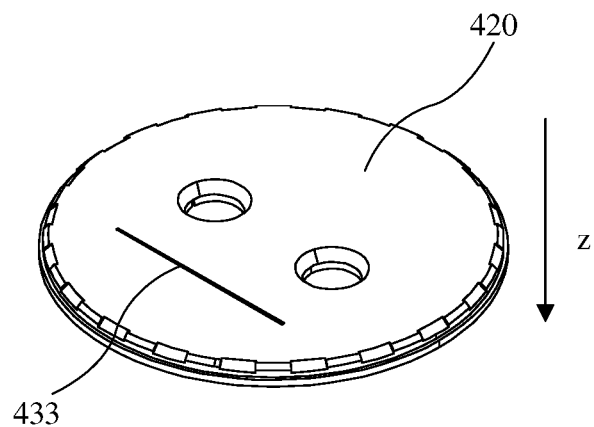
FIG. 7 is another schematic diagram of the end cap of the battery cell in FIG. 4.

As shown in FIG. 7, the first direction z is a thickness direction of a pressure relief portion 3411. In this case, the first direction z is also a thickness direction of the end cap 420. Alternatively, when the pressure relief mechanism 430 is arranged on the shell body 410, the first direction z is also a thickness direction of a corresponding wall of the shell body 410. In addition, thickness directions of the first weakened portion 432 and the second weakened portion 433 are both in the first direction z, i.e., the thickness direction of the pressure relief portion 3411.

Figure 8:
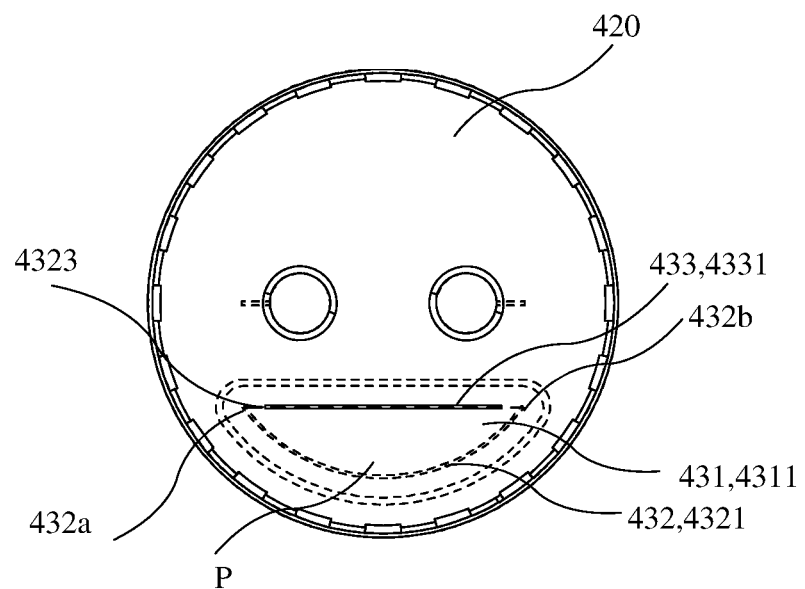
FIG. 8 is another schematic diagram of the end cap of the battery cell in FIG. 4.

The plane perpendicular to the first direction z may be a surface of the body 431 facing the interior of the battery cell, such as a plane P shown in FIG. 8, or a surface of the body 431 that faces away from the interior of the battery cell, or may be any plane perpendicular to the first direction z. The first projection 4321 of the first weakened portion 432 on the plane perpendicular to the first direction z does not intersect the second projection 4331 of the second weakened portion 433 on the same plane, which means that the first projection 4321 and the second projection 4331 are not connected together, there is a gap between one end of the second projection 4331 close to the first projection 4321 and the first projection 4321, and there is no overlapping portion between the first projection 4321 and the second projection 4331. The first weakened portion 432 and the second weakened portion 433 may be formed on the same surface of the shell 40 or on two opposite surfaces of the shell 40. In the case where the first weakened portion 432 and the second weakened portion 433 are formed on the same surface, the first projection 4321 not intersecting the second projection 4331 may mean that the first weakened portion 432 and the second weakened portion 433 are not connected together, there is a gap between one end of the second weakened portion 433 close to the first weakened portion 432 and the first weakened portion 432, and there is no overlapping portion between the first weakened portion 432 and the second weakened portion 433.

The line connecting the two first free ends 432a, 432b of the first weakened portion 432 not completely overlapping with the first weakened portion 432 means that the first weakened portion 432 does not extend in a straight line, but will bend during the extension process, that is to say, the first weakened portion 432 and the line connecting the two first free ends 432a, 432b thereof may enclose a region.

The pressure relief portion 4311 is a region of the body 431 defined by the first weakened portion 432 and the two first free ends 432a, 432b thereof. When the internal pressure or temperature of the battery cell reaches the threshold, the pressure relief portion 4311 preferentially cracks from the first weakened portion 432 and is thus partially separated from the body 431. Then, the pressure relief portion 4311 flips toward the side where the second weakened portion 433 is located under the impact of emissions, etc. inside the battery cell, such that the pressure relief portion 4311 is opened outward. After the pressure relief portion 4311 is opened, the body 431 will form a pressure relief port at a position corresponding to the pressure relief portion 4311, and the emissions (gas, electrolyte, etc.) inside the battery cell may be discharged through the pressure relief port to release the pressure inside the battery cell.

Figure 4:
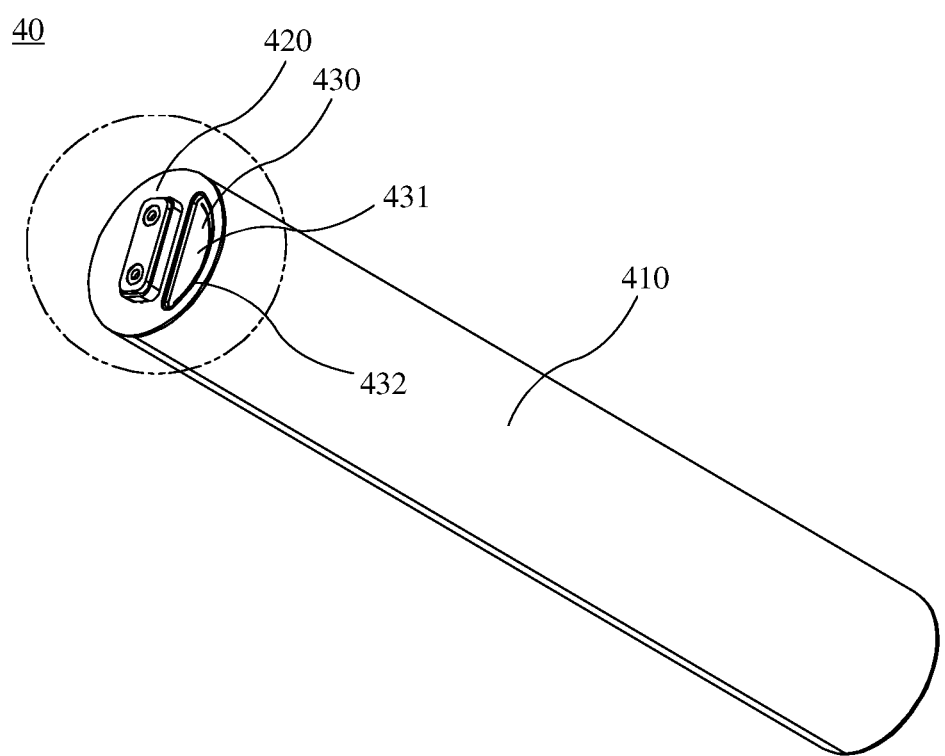
FIG. 4 is a schematic diagram of a battery cell according to some other embodiments of the present application.
Figure 5:
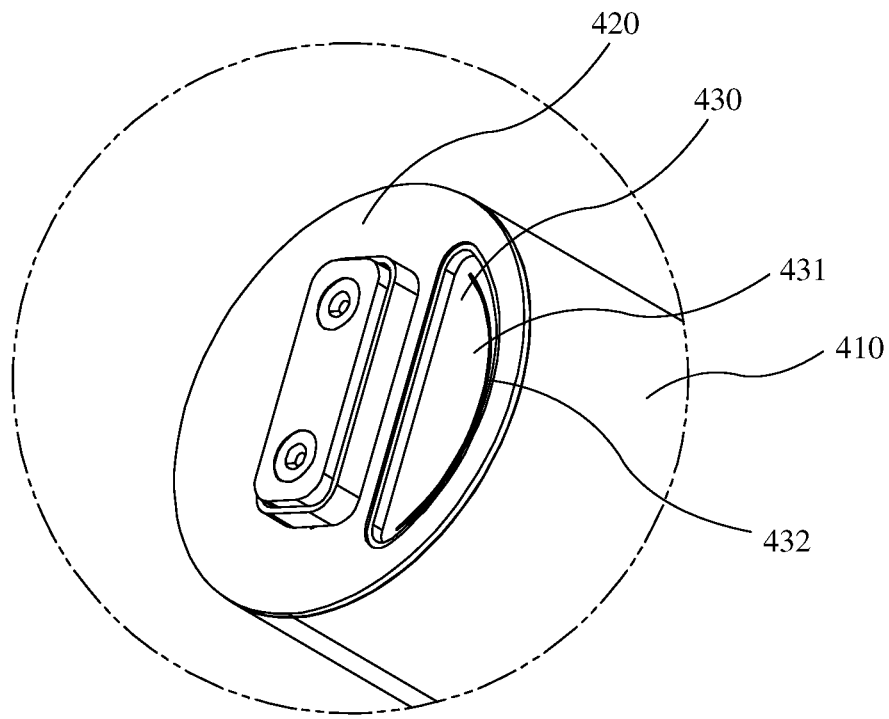
FIG. 5 is a partial enlarged view of an end cap portion of the battery cell in FIG. 4.
Figure 6:
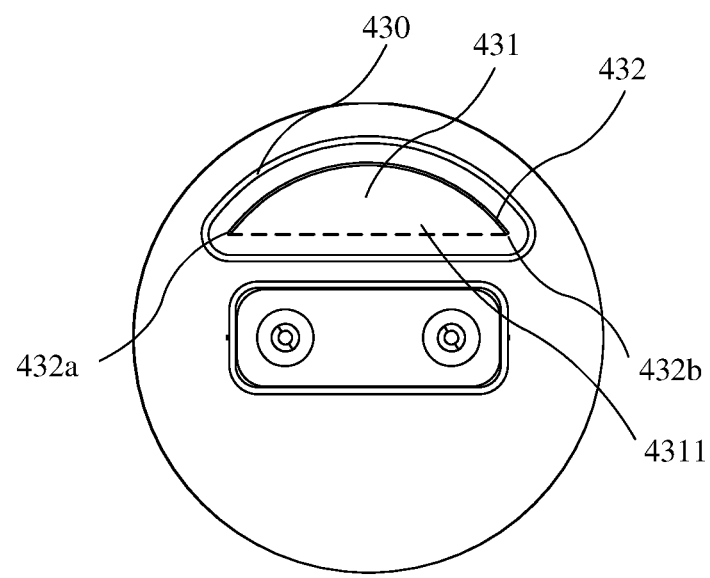
FIG. 6 is a schematic diagram of the end cap of the battery cell in FIG. 4.

It should be noted that although the shell in FIGS. 4 and 5 is cylindrical, the shell for a battery cell is not limited to be cylindrical only, but may also be in the form of, for example, a cuboid, a hexagonal prism, etc.

In the above solution of the embodiments, the first weakened portion, which is configured to crack when the internal pressure or temperature of the battery cell exceeds the threshold, may define the valve opening direction of the pressure relief mechanism 430, so that countermeasures can be taken in advance, thereby improving the safety of the battery. With the second weakened portion 433, the pressure relief portion 4311 can flip faster, so as to facilitate rapid and effective pressure relief of the battery cell. In addition, the projection of the first weakened portion 432 does not intersect the projection of the second weakened portion 433 on the plane perpendicular to the first direction, which can avoid stress concentration of the weakened portions in the intersection region, so as to reduce the risk of the pressure relief mechanism 430 starting pressure relief before the internal pressure of the battery cell reaches an initiation pressure and also prevent the pressure relief mechanism from cracking in the intersection region to result in a wrong valve opening direction, thereby improving breaking resistance of the pressure relief mechanism 430, facilitating effective pressure relief of the battery cell, and prolonging the service life of the battery cell.

Figure 9:
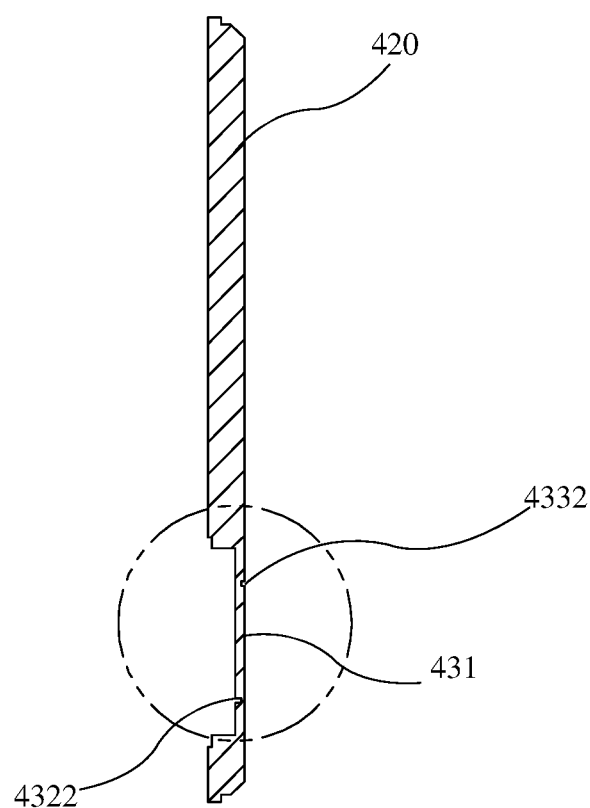
FIG. 9 is a cross-sectional view of the end cap in FIG. 8.
Figure 10:
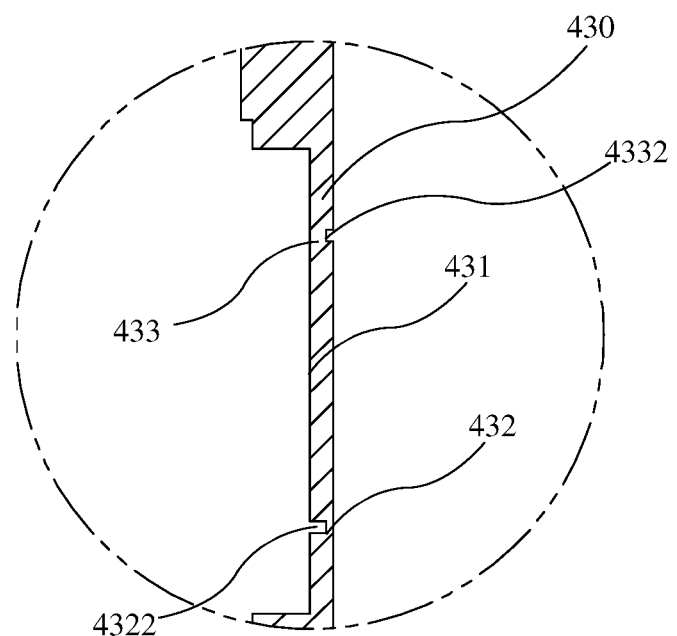
FIG. 10 is a partial enlarged view of a pressure relief mechanism of the end cap in FIG. 9.

According to some embodiments of the present application, as shown in FIGS. 9 and 10, a first pressure relief groove 4322 and a second pressure relief groove 4332 are formed in the body 431, the first weakened portion 432 is a bottom wall of the first pressure relief groove 4322, and the second weakened portion 433 is a bottom wall of the second pressure relief groove 4332.

The first pressure relief groove 4322 is recessed from the surface of the shell 40 (e.g., the end cap 420 or the shell body 410) in the thickness direction, i.e., the first direction z. With the first pressure relief groove 4322, the thickness of a wall of the shell 40 is reduced, so as to form the first weakened portion 432. The first pressure relief groove 4322 may be a notch formed in the surface of the body 431, or may be formed by machining in the body 431, or may be integrally formed with the shell 40 (e.g., the end cap 420 or the shell body 410). A machining method for forming the first pressure relief groove 4322 may include engraving forming, stamping forming, milling forming, etc., and the present application will not be limited thereto.

The second pressure relief groove 4332 is recessed from the surface of the shell 40 (e.g., the end cap 420 or the shell body 410) in the thickness direction, i.e., the first direction z. With the second pressure relief groove 4332, the thickness of the wall of the shell 40 is reduced, so as to form the second weakened portion 433. The second pressure relief groove 4332 may be a notch formed in the surface of the body 431, or may be formed by machining in the body 431, or may be integrally formed with the shell 40 (e.g., the end cap 420 or the shell body 410). A machining method for forming the second pressure relief groove 4332 may include engraving forming, stamping forming, milling forming, etc., and the present application will not be limited thereto.

The first pressure relief groove 4322 and the second pressure relief groove 4332 may be formed in the same surface of the shell 40 (e.g., the end cap 420 or the shell body 410) or in the opposite surfaces of the shell 40.

As described above, each weakened portion is arranged at the bottom of the pressure relief groove to form a part of the pressure relief mechanism 430 having a relatively low strength, which can facilitate manufacturing and machining of the weakened portion.

According to some embodiments of the present application, as shown in FIGS. 9 and 10, the first pressure relief groove 4322 is located in a first surface of the body 431, and the second pressure relief groove 4332 is located in a second surface of the body 431 opposite to the first surface.

That is to say, the first pressure relief groove 4322 and the second pressure relief groove 4332 are respectively located in two opposite surfaces of the body 431. For example, in the case where the pressure relief mechanism 430 is arranged on the end cap 420, the first pressure relief groove 4322 may be located in the surface of the end cap 420 that faces away from the interior of the battery cell, and the second pressure relief groove 4332 may be located in the surface of the end cap 420 facing the interior of the battery cell. Alternatively, the first pressure relief groove 4322 may also be located in the surface of the end cap 420 facing the interior of the battery cell, and the second pressure relief groove 4332 may be located in the surface of the end cap 420 that faces away from the interior of the battery cell. For another example, in the case where the pressure relief mechanism 430 is arranged on the shell body 410, the first pressure relief groove 4322 may be located in a surface of a wall of the shell body 410 that faces away from the interior of the battery cell, and the second pressure relief groove 4332 may be located in the surface of the same wall of the shell body 410 facing the interior of the battery cell. Alternatively, the first pressure relief groove 4322 may also be located in a surface of a wall of the shell body 410 facing the interior of the battery cell, and the second pressure relief groove 4332 may be located in the surface of the same wall of the shell body 410 that faces away from the interior of the battery cell.

Optionally, the second pressure relief groove 4332 is located in an inner surface of the body 431, which is more conducive to quick flipping of the pressure relief portion toward the exterior of the shell.

According to the above solution of the embodiments, forming the two pressure relief grooves, which define the weakened portions, in different surfaces of the body can prevent material squeezing during manufacturing of the two pressure relief grooves, so as to prevent the influence of the material squeezing on the flatness of the surfaces of the body. In addition, compared with the solution in which the two pressure relief grooves are arranged in the same surface, forming the two pressure relief grooves in different surfaces of the body can further reduce the structural strength of the body, so as to facilitate the opening and flipping of the pressure relief portion.

According to some embodiments of the present application, as shown in FIGS. 9 and 10, the first surface is an outer surface of the body 431, and the second surface is an inner surface of the body 431.

The outer surface of the body 431 is the surface of the body 431 that faces away from the interior of the battery cell. The inner surface of the body 431 is the surface of the body 431 facing the interior of the battery cell. That is to say, the first pressure relief groove 4322 may be located in the surface of the shell 40 (e.g., the shell body 410 or the end cap 420) that faces away from the interior of the battery cell, and the second pressure relief groove 4332 may be located in the surface of the shell 40 facing the interior of the battery cell.

According to the above solution of the embodiments, the arrangement of the first weakened portion 432, which is configured for opening, on the outer surface of the body 431 can facilitate the manufacturing and machining of the first pressure relief groove 4322 and improve the manufacturing quality of the first weakened portion 432, so as to facilitate the pressure relief mechanism 430 to achieve accurate and effective valve opening as required. In addition, the arrangement of the second pressure relief groove 4332 in the inner surface of the body 431 is more conducive to flipping of the pressure relief portion 4311 toward the exterior of the shell.

According to some embodiments of the present application, the depth of the first pressure relief groove 4322 is greater than that of the second pressure relief groove 4332, and the thickness of the first weakened portion 432 is less than that of the second weakened portion 433.

With the depth of the first pressure relief groove 4322 being greater than that of the second pressure relief groove 4332, the body 431 may be thinner at the first pressure relief groove 4322. In the case where the body 431 has the same thickness, the thickness of the first weakened portion 432 formed on the bottom wall of the first pressure relief groove 4322 may be less than that of the second weakened portion 433 formed on the bottom wall of the second pressure relief groove 4332.

According to the above solution of the embodiments, the body 431 may have a structural strength at the first weakened portion 432 less than that at the second weakened portion 433, such that when the internal pressure or temperature of the battery cell reaches the threshold, the pressure relief portion 4311 preferentially cracks at the first weakened portion and flips toward the side where the second weakened portion 433 is located, so as to ensure the accurate valve opening direction of the pressure relief mechanism, thereby ensuring the safety of the battery.

Figure 11:
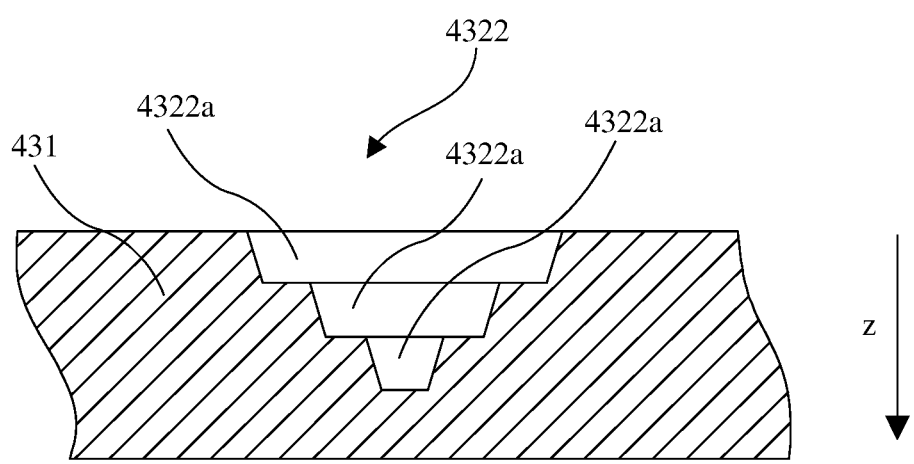
FIG. 11 is a schematic diagram of a first weakened portion according to some embodiments of the present application.

According to some embodiments of the present application, as shown in FIG. 11, the first pressure relief groove 4322 includes a plurality of first groove portions 4322a, the plurality of first groove portions 4322a are sequentially arranged in a depth direction of the first pressure relief groove 4322, and the plurality of first groove portions 4322a have widths gradually decreasing in the depth direction of the first pressure relief groove 4322.

The first groove portions 4322a in the first pressure relief groove 4322 have the same extension direction. The first groove portions 4322a may have the same depth or different depths. For example, the first groove portions 4322a have depths gradually decreasing in the depth direction of the first pressure relief groove 4322 (i.e., the first direction z).

There may be two, three, four or more first groove portions 4322a in the first pressure relief groove 4322. Illustratively, in FIG. 11, there are three first groove portions 4322a in the first pressure relief groove 4322. The first pressure relief groove 4322 may be machined in a manner as described below by taking the forming of the first pressure relief groove 4322 by stamping as an example, in which the first of the first groove portions 4322a is formed in the surface of the body 431 by stamping, then the second of the first groove portions 4322a is formed in a bottom surface of the first of the first groove portions 4322a by stamping, and finally the third of the first groove portions 4322a is formed in a bottom surface of the second of the first groove portions 4322a by stamping. It can be understood that the width of the first of the first groove portions 4322a may be greater than that of the second of the first groove portions 4322a, and the width of the second of the first groove portions 4322a may be greater than that of the third of the first groove portions 4322a.

The first pressure relief groove 4322 is of a multi-stage groove structure as described above, which can reduce a forming force applied to the body 431 during forming of each stage of groove, so as to reduce the risk of generating cracks in the body 431 during forming of the first pressure relief groove 4322, thereby improving the long-term reliability of the pressure relief mechanism 430.

Figure 12:
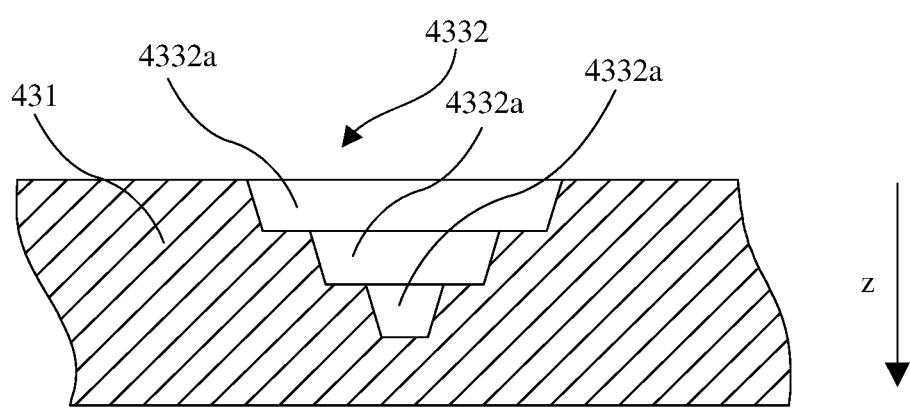
FIG. 12 is a schematic diagram of a second weakened portion according to some embodiments of the present application.

According to some embodiments of the present application, as shown in FIG. 12, the second pressure relief groove 4332 includes a plurality of second groove portions 4332a, the plurality of second groove portions 4332a are sequentially arranged in a depth direction of the second pressure relief groove 4332, and the plurality of second groove portions 4332a have widths gradually decreasing in the depth direction of the second pressure relief groove 4332.

The second groove portions 4332a in the second pressure relief groove 4332 have the same extension direction. The second groove portions 4332a may have the same depth or different depths. For example, the second groove portions 4332a have depths gradually decreasing in the depth direction of the second pressure relief groove 4332 (i.e., the first direction z).

There may be two, three, four or more second groove portions 4332a in the second pressure relief groove 4332. Illustratively, in FIG. 12, there are three second groove portions 4332a in the second pressure relief groove 4332. The second pressure relief groove 4332 is machined in the same manner as that for the first pressure relief groove, which will not be described in detail herein.

The second pressure relief groove 4332 is of a multi-stage groove structure as described above, which can reduce a forming force applied to the body 431 during forming of each stage of groove, so as to reduce the risk of generating cracks in the body 431 during forming of the second pressure relief groove 4332, thereby improving the long-term reliability of the pressure relief mechanism 430.

Figure 13:
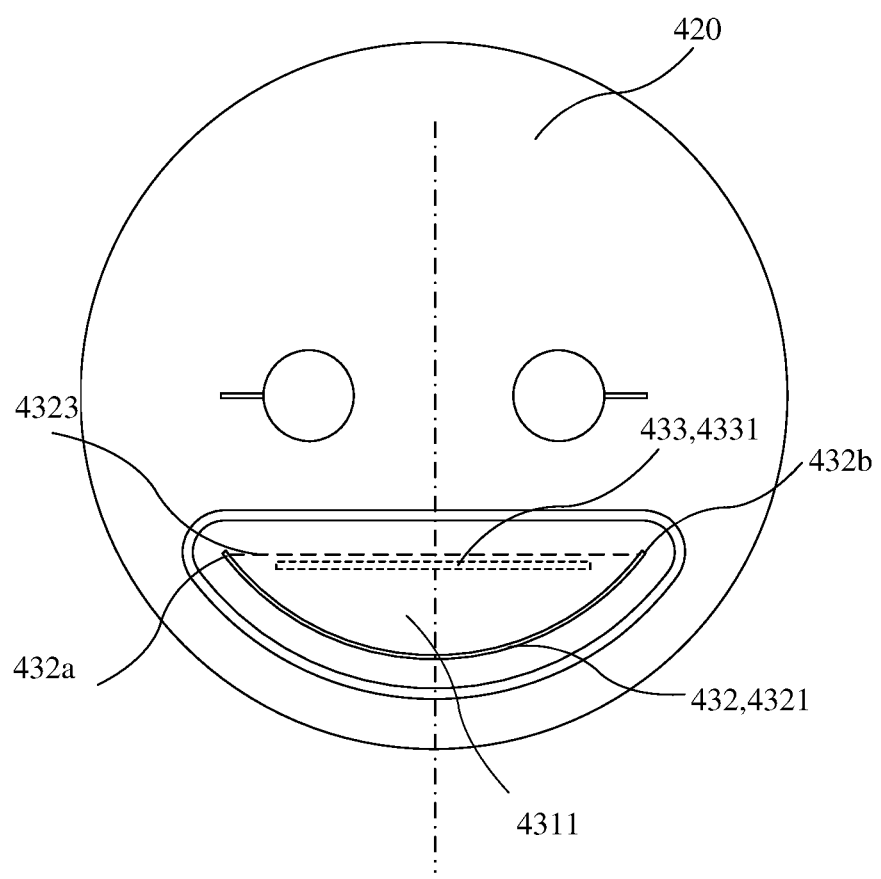
FIG. 13 is a schematic diagram of an end cap including a pressure relief mechanism according to some other embodiments of the present application.

According to some embodiments of the present application, as shown in FIG. 13, the line connecting the two first free ends 432a, 432b has a third projection 4323 on the plane, and an extension direction of the second projection 4331 is consistent with that of the third projection 4323.

As described above, the above plane is a plane perpendicular to the first direction z, which may be a surface of the body 431 facing the interior of the battery cell, such as the plane P shown in FIG. 8, or a surface of the body 431 that faces away from the interior of the battery cell, or may be any plane perpendicular to the first direction z. The extension direction of the second projection 4331 being consistent with that of the third projection 4323 may include the case of the second projection 4331 being parallel to the third projection 4323 (that is, there is a gap in a direction perpendicular to this extension direction) and the case of the second projection 4331 and the third projection 4323 being on a straight line (including the second projection complete overlapping, partial overlapping, or not overlapping with the third projection). The second projection 4331 being parallel to the third projection 4323 may include being parallel in the case where the perpendicular bisector of the second projection 4331 overlaps with the perpendicular bisector of the third projection 4323, in the case where the perpendicular bisector of the second projection 4331 does not overlap with the perpendicular bisector of the third projection 4323 while the second projection 4331 is at least partially staggered with the third projection 4323, or in the case where the perpendicular bisector of the second projection 4331 does not overlap with the perpendicular bisector of the third projection 4323 while the second projection 4331 and the third projection 4323 are completely staggered with each other (i.e., completely deviated from each other), etc., and the present application will not be limited to the above examples. It should be noted here that "the extension directions being consistent" herein may mean that the extension directions of the two projections are at 0° or 180°, or the extension directions of the two projections are approximately at 0° or 180°.

According to the above solution of the embodiments, the extension direction of the line connecting the two free ends 432a, 432b of the first weakened portion 432 is set to be consistent with the extension direction of the second weakened portion 433, so that the pressure relief portion 4311 can flip in a more accurate flipping direction, so as to facilitate effective pressure relief of the battery cell.

Figure 14:
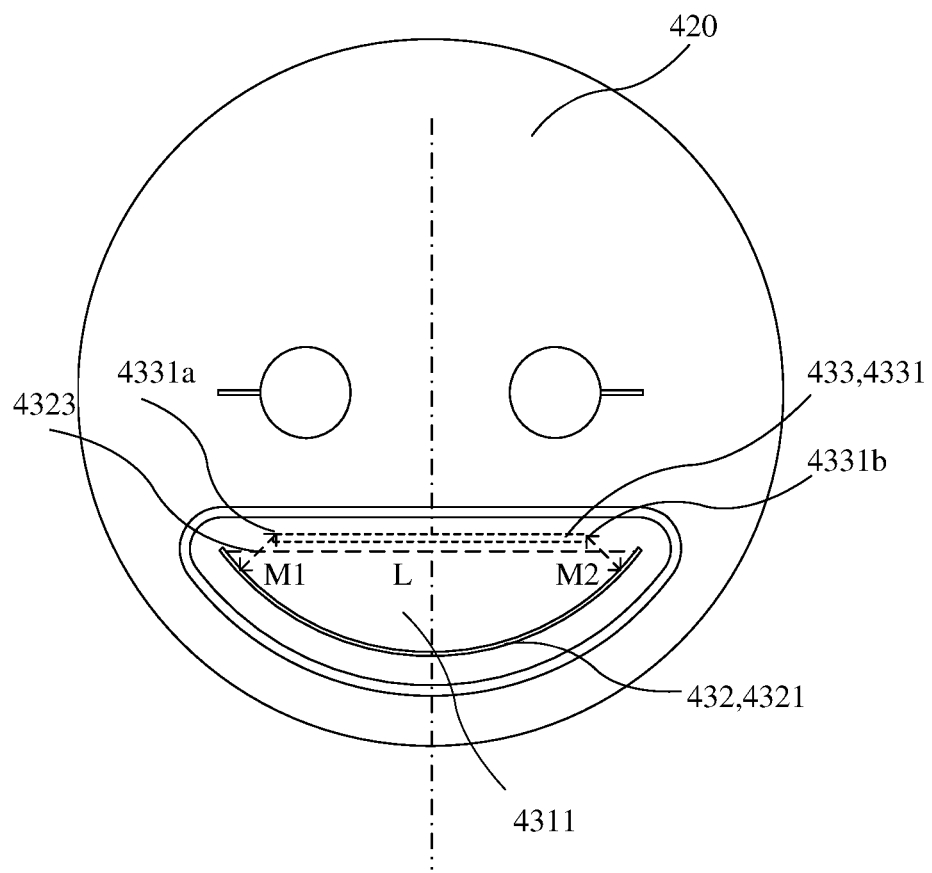
FIG. 14 is a schematic diagram of an end cap including a pressure relief mechanism according to some other embodiments of the present application.

According to some embodiments of the present application, as shown in FIGS. 8, 13 and 14, the second projection 4331 at least partially overlaps with the third projection 4323 in a direction perpendicular to the extension direction of the second projection 4331.

Specifically, in the case of the second projection 4331 being parallel to the third projection 4323, the second projection 4331 is at least partially staggered with the third projection 4323, or in the case of the second projection 4331 and the third projection 4323 being on a straight line, the second projection 4331 at least partially overlaps with the third projection 4323. In the case where the second projection 4331 is parallel to the third projection 4323, the second projection 4331 being at least partially staggered with the third projection 4323 may include the case where the perpendicular bisector of the second projection 4331 overlaps with the perpendicular bisector of the third projection 4323, and the case where the perpendicular bisector of the second projection 4331 does not overlap with the perpendicular bisector of the third projection 4323 while the second projection 4331 is at least partially staggered with the third projection 4323. In the case where the second projection 4331 and the third projection 4323 are on a straight line, the second projection 4331 at least partially overlapping with the third projection 4323 include the case where the second projection 4331 completely overlaps with the third projection 4323 (including the case where the shorter projection is completely located within the longer projection or the case where the two projections completely overlap), or the case where the second projection 4331 partially overlaps with the third projection 4323.

According to the above solution of the embodiments, it is further possible to allow the pressure relief portion 4311 to flip faster toward the side where the second weakened portion is located, so as to facilitate rapid and effective pressure relief of the battery cell.

According to some embodiments of the present application, as shown in FIG. 13, the second projection 4331 is located on one side of the third projection 4323 close to the first projection 4321, and is spaced apart from the third projection 4323.

That is to say, the second projection 4331 is located in the pressure relief portion 4311 defined by the first weakened portion 432 and the line connecting the two first free ends 432a, 432b thereof, and is close to the third projection 4323.

According to the above solution of the embodiments, the flipping force can be transferred to the vicinity of the second weakened portion faster, so that the pressure relief portion can flip faster, so as to achieve rapid and effective pressure relief of the battery cell.

According to some embodiments of the present application, as shown in FIG. 14, the second projection 4331 is located on one side of the third projection 4323 that faces away from the first projection 4321, and is spaced apart from the third projection 4323.

That is to say, as shown in FIG. 14, the second projection 4331 is located outside the pressure relief portion 4311 defined by the first weakened portion 432 and the line connecting the two first free ends 432a, 432b thereof, and is close to the third projection 4323.

According to the above solution of the embodiments, the pressure relief portion have a larger valve opening area, so as to facilitate rapid and effective pressure relief of the battery cell.

According to some embodiments of the present application, as shown in FIGS. 8, 13 and 14, a perpendicular bisector of the third projection 4323 overlaps with a perpendicular bisector of the second projection 4331.

Specifically, as shown in FIG. 8, in the case of the third projection 4323 and the second projection 4331 being located on the same straight line, the third projection 4323 and the second projection 4331 completely overlap and are symmetrical with respect to the perpendicular bisector. As shown in FIGS. 13 and 14, in the case of the third projection 4323 being parallel to the second projection 4331, the third projection 4323 and the second projection 4331 are completely opposite to each other and are symmetrical with respect to the perpendicular bisector.

According to the above solution of the embodiments, the second weakened portion 433 may be symmetrical with respect to the perpendicular bisector of the line connecting the two first free ends 432a, 432b of the first weakened portion 432, and the pressure relief portion 4311 can better flip toward the side where the second weakened portion is located, so as to achieve more accurate flipping direction and valve opening direction of the pressure relief portion, thereby achieving higher safety.

According to some embodiments of the present application, as shown in FIGS. 8, 13 and 14, the first projection 4321 is symmetrical with respect to the perpendicular bisector of the third projection 4323.

That is to say, the first weakened portion 432 is symmetrical with respect to the perpendicular bisector of the line connecting the two first free ends 432a, 432b thereof.

According to the above solution of the embodiments, the first weakened portion 432 may have the consistent structural strength and stress bearing capacity on two sides of the perpendicular bisector thereof, which ensures that the first weakened portion 432 opens synchronously on two sides when the internal pressure of the battery cell reaches the threshold, so as to achieve more accurate valve opening direction of the pressure relief mechanism 430, thereby achieving higher safety.

According to some embodiments of the present application, as shown in FIG. 14, the second projection 4331 has two second free ends 4331a, 4331b, and the minimum gap M1 between one second free end 4331a and the first projection 4321 is not greater than one third of a length L of the third projection 4323, and/or the minimum gap M2 between the other second free end 4331b and the first projection 4321 is not greater than one third of the length L of the third projection 4323.

The minimum gap M1 between the second free end 4331a and the first projection 4321 is a vertical distance from the second free end 4331a to the first projection 4321. The minimum gap M2 between the second free end 4331b and the first projection is a vertical distance from the second free end 4331b to the first projection 4321.

According to the above solution of the embodiments, the gap between the first weakened portion 432 and the second weakened portion 433 is set within a reasonable range, which can ensure the pressure relief portion to quickly and accurately flip toward the side where the second weakened portion 433 is located after cracking along the first weakened portion 432.

According to some embodiments of the present application, as shown in FIG. 14, the minimum gap M1 between one second free end 4331a and the first projection 4321 is less than 10 mm, and/or the minimum gap M2 between the other second free end 4331b and the first projection 4321 is less than 10 mm.

That is to say, the distance between the second weakened portion 433 and the first weakened portion 432 in a direction perpendicular to the first direction z should not be too large, and the second weakened portion 433 cannot achieve the function of increasing the flipping speed of the pressure relief portion 4311 due to the excessive distance between the weakened portions.

According to the above solution of the embodiments, it is possible to facilitate the pressure relief portion 4311 to quickly and accurately flip toward the side where the second weakened portion 433 is located, so as to facilitate rapid and effective pressure relief of the pressure relief mechanism 430.

According to some embodiments of the present application, the first projection 4321 is in the form of an arc, a fold line, or a combination of an arc and a fold line.

That is to say, the first weakened portion 432 extends along a trajectory of an arc, a fold line, or a combination of an arc and a fold line.

According to the above solution of the embodiments, by means of setting the shape of the extending trajectory of the first weakened portion 432, the shape of the pressure relief portion 4311 may be set to increase the valve opening area of the pressure relief mechanism 430 to achieve rapid pressure relief, thereby further improving the safety. In the case where the length and width of the pressure relief portion 4311 defined by the first weakened portion 432 are constant, the valve opening area defined by the arc is greater than that defined by the fold line, thereby further improving the safety. In addition, in the case where the valve opening area is constant, there is a shorter line connecting the two first free ends of the arc-shaped first weakened portion 432, thus having less influence on the structural strength of the shell 40.

According to some embodiments of the present application, the second projection 4331 (i.e., the second weakened portion 433) may be in the form of a straight line, i.e., extend along a trajectory of a straight line, so as to facilitate the flipping of the pressure relief portion 4311.

According to some embodiments of the present application, the shell 40 includes a shell body 410 with an opening and an end cap 420 covering the opening, an accommodating cavity for accommodating the battery cell is formed between the shell body 410 and the end cap 420, and the pressure relief mechanism 430 is arranged on at least one side wall of the shell body 410, and/or the pressure relief mechanism 430 is arranged on the end cap 420.

The features of the battery cell in the above implementation solution are substantially the same as those of the battery cell 20 described in FIGS. 2 and 3, which will not be described in detail herein. The features of the end cap 420 and the shell body 410 are substantially the same as those of the end cap 21 and the shell body 22 described above in FIG. 3, which will not be described in detail herein. The pressure relief mechanism 430 may be arranged on the shell body 410 or on the end cap 420. It can be understood that in the case where the pressure relief mechanism 430 is arranged on the shell body 410, the pressure relief mechanism 430 may be provided on only one wall, or the pressure relief mechanism 430 may be provided on multiple walls. In addition, the shell 40 may include a plurality of pressure relief mechanisms 430, and the plurality of pressure relief mechanisms 430 may be all arranged on the shell body 410, or all arranged on the end cap 420, or some are arranged on the shell body 410 while some are arranged on the end cap 420.

In this way, the pressure relief mechanism 430 may be integrated in the shell body 410 or end cap 420 that can accommodate the battery cell, so that the pressure relief mechanism has both an accommodating function and a pressure relief function.

Figure 15:
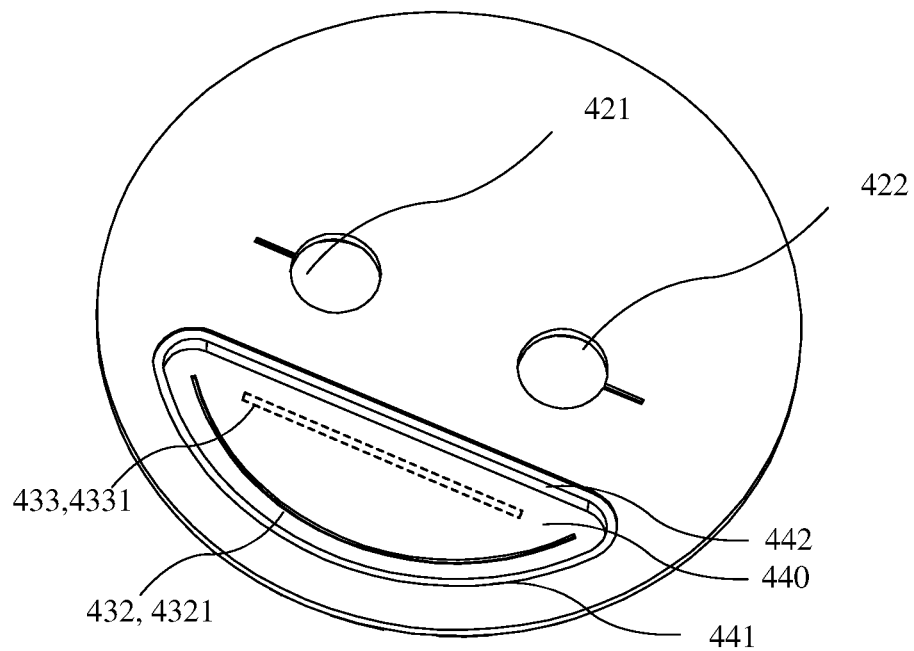
FIG. 15 is a schematic diagram of an end cap including a pressure relief mechanism according to some other embodiments of the present application.

According to some embodiments of the present application, as shown in FIG. 15, a recess 440 is formed in the shell 40, and the body 431 of the pressure relief mechanism 430 is a recess bottom of the recess 440.

The recess 440 may be formed in the end cap 420, as shown in FIG. 15. Additionally or alternatively, the recess 440 may also be formed in the shell body 410. In the case where the recess 440 is provided in the end cap 420, the recess 440 is recessed from the surface of the end cap 420 in the thickness direction. The recess 440 may be formed in an inner surface or an outer surface of the end cap 420. In the case where the recess 440 is formed in the shell body 410, the recess 440 is recessed from an outer surface or an inner surface of the shell body 410 in the thickness direction. The recess 440 may be formed in the shell 40 by cutting, stamping, etc., or may be integrally formed with the shell 40 by casting.

As described above, the shell 40 is provided with the recess 440, and the body 431 is formed on a bottom wall of the recess 440, so that the thickness of the body 431 may be less than the wall thickness of other part of the shell 40, so as to facilitate the valve opening of the pressure relief mechanism 430. In addition, the recess 440 is recessed from the surface of the shell 40, so that the pressure relief mechanism 430 formed on the bottom wall of the recess 440 may be away from the surface of the shell 40, and thus the pressure relief mechanism 430 is not likely to come into contact with other objects to cause damage.

According to some embodiments of the present application, as shown in FIG. 15, side walls of the recess 440 include a first side wall 441 and a second side wall 442 opposite to each other, an extension direction of a projection of the first side wall 441 on the plane is consistent with the extension direction of the first projection 4321, and an extension direction of a projection of the second side wall 442 on the plane is consistent with the extension direction of the second projection 4331.

The plane may be a surface of the body 431 facing the interior of the battery cell, such as the plane P shown in FIG. 8, or a surface of the body 431 that faces away from the interior of the battery cell, or may be any plane perpendicular to the first direction z. The extension direction of the projection of the first side wall 441 on the plane being consistent with the extension direction of the first projection 4321 may mean being completely consistent, that is, completely parallel, or being parallel with a certain deviation. The extension direction of the projection of the second side wall 442 on the plane being consistent with the extension direction of the second projection 4331 may mean being completely consistent, that is, completely parallel, or being parallel with a certain deviation.

According to the above solution of the embodiments, each weakened portion may be machined with the corresponding side wall of the recess 440 as the reference, so as to facilitate the machining of the weakened portion.

According to some embodiments of the present application, the thickness of the body 431 is less than that of the part of the shell 40 other than the pressure relief mechanism 430.

That is to say, the thickness of the part of the shell 40 where the body 431 is located is less than the wall thickness of the other part of the shell 40.

According to the above solution of the embodiments, it is possible to facilitate the smooth opening and flipping of the pressure relief portion 4311, and prevent the other part of the shell from cracking early when the internal pressure or temperature of the battery cell exceeds the threshold.

According to some embodiments of the present application, as shown in FIG. 15, the end cap 420 may further include two through holes 421, 422 for mounting electrode terminals. In this case, the pressure relief mechanism 430 is arranged on the end cap 420, the second weakened portion 433 may be parallel to a line connecting the two through holes 421, 422, and the first weakened portion 432 intersects a perpendicular bisector of the line connecting the two through holes 421, 422. This is because when the internal pressure of the battery cell increases, the end cap 420 expands and deforms, the perpendicular bisector of the line connecting the two through holes 421, 422 is a stress and deformation center line of the end cap 420 on which there is a relatively concentrated stress of the end cap. The first weakened portion 432 of the pressure relief mechanism 430 is set to intersect the perpendicular bisector of the line connecting the two through holes 421, 422 such that, when the internal pressure of the battery cell reaches the threshold, the first weakened portion can preferentially crack inside at a position and continue to crack to both sides, so as to further increase the valve opening area, thereby achieving effective pressure relief.

According to some embodiments of the present application, the thickness of the first weakened portion 432 gradually increases on one side or two sides of the perpendicular bisector of the line connecting the two through holes 421, 422 in a direction away from the perpendicular bisector of the line connecting the two through holes 421, 422. The part of the first weakened portion 432 of the pressure relief mechanism 430 having the minimum thickness is set on the perpendicular bisector of the line connecting the two through holes 421, 422 such that, when the internal pressure of the battery cell reaches the threshold, the maximum stress on the end cap 420 acts on the part of the first weakened portion having the minimum thickness, so as to ensure the first weakened portion 432 of the pressure relief mechanism 430 to preferentially crack at the part having the minimum thickness. Then, under the internal pressure of the battery cell, the pressure relief mechanism 430 is likely to continue to crack along the first weakened portion 432, so as to further increase the valve opening area, thereby achieving effective pressure relief to ensure the safety of the battery.

According to some embodiments of the present application, the first weakened portion 432 is symmetrical with respect to the perpendicular bisector of the line connecting the two through holes 421, 422. In this way, the first weakened portion 432 may be subjected to the same stress on two sides of the perpendicular bisector, which ensures that the pressure relief mechanism 430 cracks from the middle to two sides along the first weakened portion 432, so as to further control the valve opening direction of the pressure relief mechanism 430, thereby improving the safety. Additionally, the second weakened portion 433 may also be symmetrical with respect to the perpendicular bisector of the line connecting the two through holes 421, 422.

According to some embodiments of the present application, as shown in FIGS. 4 to 15, the present application provides a shell 40 for a battery cell, the shell including: a shell body 410 including an opening, an end cap 420 covering the opening, and a pressure relief mechanism 430. The pressure relief mechanism 430 includes a body 431, a first weakened portion 432, and a second weakened portion 433. A recess 440 is formed in the end cap 420, and the body 431 of the pressure relief mechanism 430 is the recess bottom of the recess 440. The first weakened portion 432 is arranged on the body 431 and has two first free ends 432a, 432b, and a line connecting the two first free ends 432a, 432b and the first weakened portion 432 jointly define a pressure relief portion 4311. The first weakened portion 432 extends along a trajectory of an arc. The second weakened portion 433 is arranged on the body 431 and extends along a trajectory of a straight line. The first weakened portion 432 is arranged on an outer surface of the body 431, and the second weakened portion 433 is arranged on an inner surface of the body 431. A first projection 4321 of the first weakened portion 432 on a plane perpendicular to a first direction z does not intersect a second projection 4331 of the second weakened portion 433 on the plane, and the first direction z is a thickness direction of the pressure relief portion 4311. The pressure relief portion 4311 is configured to, when an internal pressure or temperature of the battery cell reaches a threshold, open with the first weakened portion 432 as a boundary and flip toward one side where the second weakened portion 433 is located.

According to the above solution of the embodiments, it is possible to improve breaking resistance of the pressure relief mechanism, facilitate effective pressure relief of the battery cell, and prolong the service life of the battery cell, thereby improving safety of the battery.

According to some embodiments of the present application, a battery cell is provided, including a shell 40 in the above embodiments.

According to the above solution of the embodiments, it is possible to improve breaking resistance of the pressure relief mechanism, facilitate effective pressure relief of the battery cell, and prolong the service life of the battery cell, thereby improving safety of the battery.

According to some embodiments of the present application, a battery is provided, including a battery cell in the above embodiments.

According to the above solution of the embodiments, it is possible to improve breaking resistance of the pressure relief mechanism, facilitate effective pressure relief of the battery cell, and prolong the service life of the battery cell, thereby improving safety of the battery.

According to some embodiments of the present application, a power consuming device is provided, including a battery in the above embodiments configured to supply electric energy.

According to the above solution of the embodiments, it is possible to improve breaking resistance of the pressure relief mechanism, facilitate effective pressure relief of the battery cell, and prolong the service life of the battery cell, thereby improving safety of the battery.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A shell for a battery cell, comprising a pressure relief mechanism, wherein the pressure relief mechanism comprises:
    a body;
    a first weakened portion arranged on the body, the first weakened portion having two first free ends, and a straight line connecting the two first free ends not completely overlapping with the first weakened portion and jointly defining a pressure relief portion; and
    a second weakened portion arranged on the body, a first projection of the first weakened portion on a plane perpendicular to a first direction not intersecting a second projection of the second weakened portion on the plane, the first direction being a thickness direction of the pressure relief portion,
    wherein the pressure relief portion is configured to, when an internal pressure or temperature of the battery cell reaches a threshold, open with the first weakened portion as a boundary and flip toward one side where the second weakened portion is located.

2. The shell according to claim 1, wherein a first pressure relief groove and a second pressure relief groove are formed in the body, the first weakened portion is a bottom wall of the first pressure relief groove, and the second weakened portion is a bottom wall of the second pressure relief groove.

3. The shell according to claim 2, wherein the first pressure relief groove is located in a first surface of the body, and the second pressure relief groove is located in a second surface of the body opposite to the first surface.

4. The shell according to claim 2, wherein the first surface is an outer surface of the body, and the second surface is an inner surface of the body.

5. The shell according to claim 2, wherein the depth of the first pressure relief groove is greater than that of the second pressure relief groove, and the thickness of the first weakened portion is less than that of the second weakened portion.

6. The shell according to claim 2, wherein the first pressure relief groove comprises a plurality of first groove portions, which are sequentially arranged in a depth direction of the first pressure relief groove and have widths gradually decreasing in the depth direction of the first pressure relief groove.

7. The shell according to claim 2, wherein the second pressure relief groove comprises a plurality of second groove portions, which are sequentially arranged in a depth direction of the second pressure relief groove and have widths gradually decreasing in the depth direction of the second pressure relief groove.

8. The shell according to claim 1, wherein the straight line connecting the two first free ends has a third projection on the plane, and an extension direction of the second projection is consistent with that of the third projection.

9. The shell according to claim 8, wherein the second projection at least partially overlaps with the third projection in a direction perpendicular to the extension direction of the second projection.

10. The shell according to claim 8, wherein the second projection is located on one side of the third projection close to the first projection, and is spaced apart from the third projection.

11. The shell according to claim 8, wherein the second projection is located on one side of the third projection that faces away from the first projection, and is spaced apart from the third projection.

12. The shell according to claim 8, wherein a perpendicular bisector of the third projection overlaps with a perpendicular bisector of the second projection.

13. The shell according to claim 8, wherein the first projection is symmetrical with respect to the perpendicular bisector of the third projection.

14. The shell according to claim 8, wherein:
the second projection has two second free ends, and the minimum gap between one of the second free ends and the first projection is not greater than one third of a length of the third projection; and/or
the minimum gap between the other second free end and the first projection is not greater than one third of the length of the third projection.

15. The shell according to claim 14, wherein:
the minimum gap between one of the second free ends and the first projection is less than 10 mm, and/or
the minimum gap between the other second free end and the first projection is less than 10 mm.

16. The shell according to claim 1, wherein the first projection is in the form of an arc, a fold line, or a combination of an arc and a fold line.

17. The shell according to claim 1, further comprising:
a shell body with an opening and an end cap covering the opening;
wherein an accommodating cavity for accommodating the battery cell is formed between the shell body and the end cap; and
wherein:
the pressure relief mechanism is arranged on at least one of side walls of the shell body, and/or
the pressure relief mechanism is arranged on the end cap.

18. The shell according to claim 1, wherein a recess is formed in the shell, and the body of the pressure relief mechanism is a recess bottom of the recess.

19. The shell according to claim 18, wherein side walls of the recess include a first side wall and a second side wall opposite to each other, an extension direction of a projection of the first side wall on the plane is consistent with an extension direction of the first projection, and an extension direction of a projection of the second side wall on the plane is consistent with the extension direction of the second projection.

20. The shell according to claim 1, wherein the thickness of the body is less than a portion of the shell other than the pressure relief mechanism.

* * * * *